(12) United States Patent
Takahata et al.

(10) Patent No.: US 8,936,875 B2
(45) Date of Patent: Jan. 20, 2015

(54) NEGATIVE ELECTRODE CONTAINING GRAPHITE FOR LITHIUM ION SECONDARY BATTERY

(75) Inventors: Koji Takahata, Toyota (JP); Hideki Sano, Daito (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/937,419

(22) PCT Filed: Dec. 16, 2009

(86) PCT No.: PCT/JP2009/070960
§ 371 (c)(1),
(2), (4) Date: Oct. 12, 2010

(87) PCT Pub. No.: WO2011/074083
PCT Pub. Date: Jun. 23, 2011

(65) Prior Publication Data
US 2012/0244417 A1  Sep. 27, 2012

(51) Int. Cl.
*H01M 4/133* (2010.01)
*H01M 4/583* (2010.01)
(Continued)

(52) U.S. Cl.
CPC .......... *H01M 10/0525* (2013.01); *H01M 4/133* (2013.01); *H01M 10/0566* (2013.01); *Y02E 60/122* (2013.01); *Y02T 10/7011* (2013.01)
USPC .................... 429/231.8; 429/231.95; 429/322

(58) Field of Classification Search
USPC ........................ 429/163, 231.8, 231.95, 322
See application file for complete search history.

(56) References Cited

U.S. PATENT DOCUMENTS

2005/0079757 A1* 4/2005 Watanabe .................... 439/500
2006/0188784 A1* 8/2006 Sudoh et al. ................. 429/232
(Continued)

FOREIGN PATENT DOCUMENTS

| EP | 1 903 628 | 3/2008 |
| JP | 5-41251 | 2/1993 |

(Continued)

OTHER PUBLICATIONS

Hayashi et al., Machine translation of JP 2007-169160 A, Jul. 2007.*

*Primary Examiner* — Sean P Cullen
(74) *Attorney, Agent, or Firm* — Finnegan, Henderson, Farabow, Garrett & Dunner, LLP (57) ABSTRACT

In a lithium ion secondary battery, an electrode assembly, in which a positive electrode sheet having a positive electrode mixture layer and a negative electrode sheet having a negative electrode mixture layer are overlain each other, is housed in a container together with a nonaqueous electrolyte solution. The negative electrode mixture layer includes a carbon material having at least in part a graphite structure as a negative active material. When S ($m^2$) represents a value obtained by calculating a total surface area of the negative electrode active material included in a region of the negative electrode mixture layer lying opposite the positive electrode mixture layer per 1 Ah of capacity of the battery, V represents a value obtained by calculating a total volume of pores included in the region of the negative electrode mixture layer per 1 Ah of capacity of the battery, and N represents the number of lithium ions included within the volume V of the nonaqueous electrolyte solution, the value α computed by the formula $\alpha = S \times N$ is from $1 \times 10^{22}$ to $2.5 \times 10^{22}$.

8 Claims, 2 Drawing Sheets

(51) Int. Cl.
*H01M 10/0525* (2010.01)
*H01M 10/056* (2010.01)
*H01M 10/0566* (2010.01)

(56) References Cited

U.S. PATENT DOCUMENTS

2007/0003837 A1   1/2007   Nishimura et al.
2008/0220327 A1*  9/2008   Kim ............................. 429/164
2008/0220329 A1*  9/2008   Kojima et al. ................ 429/188

FOREIGN PATENT DOCUMENTS

| | | |
|---|---|---|
| JP | 6-338345 | 12/1994 |
| JP | 2002-110250 | 4/2002 |
| JP | 2006-294316 | 10/2006 |
| JP | 2006-303118 | 11/2006 |
| JP | 2007-87801 | 4/2007 |
| JP | 2007-169160 | 7/2007 |

* cited by examiner

FIG.4

NEGATIVE ELECTRODE CONTAINING GRAPHITE FOR LITHIUM ION SECONDARY BATTERY

CROSS-REFERENCE TO RELATED APPLICATIONS

This application is a national phase application of International Application No. PCT/JP2009/070960, filed Dec. 16, 2009, the contents of which are incorporated herein by reference.

TECHNICAL FIELD

The present invention relates to a lithium ion secondary battery, and more particularly to a lithium ion secondary battery which includes a graphite-based negative electrode active material.

BACKGROUND ART

In recent years, lithium secondary batteries have grown increasingly important as on-board vehicle power supplies and power supplies for personal computers and handheld devices. In particular, it is expected that lithium ion secondary batteries, which are lightweight and capable of achieving a high energy density, will see preferred use as high-output power supplies for on-board use in vehicles. In one typical lithium ion secondary battery configuration, charging and discharging are carried out by the movement of lithium ions back and forth between a positive electrode mixture layer containing a positive electrode active material and a negative electrode mixture layer containing a negative electrode active material. The negative electrode active material is preferably a carbon material having in at least a portion thereof a graphite structure. Examples of technical literature relating to lithium secondary batteries include Patent Documents 1 to 4.
Patent Document 1: Japanese Patent Application Laid-open No. H5-41251
Patent Document 2: Japanese Patent Application Laid-open No. 2006-303118
Patent Document 3: Japanese Patent Application Laid-open No. 2002-110250
Patent Document 4: Japanese Patent Application Laid-open No. H6-338345

It is expected that, of the various applications for lithium ion secondary batteries, there may be some in which the battery is placed under broad temperature conditions ranging from low to high temperature and used in a manner where it is repeatedly charged at a high rate (quick charging). Lithium ion secondary batteries to be used as the power source in vehicles (e.g., lithium ion secondary batteries mounted in hybrid vehicles which use both lithium ion secondary batteries and another source of power having a different principle of operation, such as an internal combustion engine) are illustrative of lithium ion secondary batteries for which such a manner of use is anticipated. There exists a desire that lithium ion secondary batteries for such applications, on exposure to the above broad temperature range conditions, incur little decrease in capacity (have a high capacity retention) even when placed in a state of non-use for an extended period of time, and experience little decrease in battery performance even when repeatedly charged at a high rate (e.g., undergo little rise in internal resistance).

However, because capacity retention and high-rate characteristics are generally contradictory properties, achieving both these properties to a high level at the same time is difficult. In light of these circumstances, the chief object of the present invention is to provide a lithium ion secondary battery which exhibits a high capacity retention even when stored under high-temperature conditions, and which undergoes little deterioration in performance even when a charge-discharge pattern that includes high-rate charging is repeated under low-temperature conditions.

DISCLOSURE OF THE INVENTION

According to the art disclosed in this specification, there is provided a lithium ion secondary battery that includes an electrode assembly in which a sheet-like positive electrode (positive electrode sheet) having a positive electrode mixture layer on a positive electrode collector and a sheet-like negative electrode (negative electrode sheet) having a negative electrode mixture layer on a negative electrode collector are overlain each other with a separator disposed therebetween, and the electrode assembly is housed in a container together with a lithium ion-containing nonaqueous electrolyte solution. The negative electrode mixture layer contains, as a negative electrode active material which is the primary component thereof, a carbon material having at least in part a graphite structure. The battery is characterized in that, when S (m$^2$) represents a value obtained by calculating a total surface area of the negative electrode active material included in a region of the negative electrode mixture layer lying opposite the positive electrode mixture layer (the surface area which participates in the ingress and egress of lithium ions; i.e., the reaction surface area) per unit (1 Ah) of capacity of the battery (sometimes referred to below as the "negative electrode active material reaction surface area per unit of battery capacity"), V represents a value obtained by calculating a total volume of pores included in the region of the negative electrode mixture layer per unit (1 Ah) of capacity of the battery (sometimes referred to below as the "pore volume in the negative electrode mixture layer per unit of battery capacity"), and N represents the number of lithium ions contained within the nonaqueous electrolyte solution of volume V (sometimes referred to below as the "number of lithium ions in the pores of the negative electrode mixture layer per unit of battery capacity"), the value α computed by the following formula (A)

$$\alpha = S \times N \quad (A)$$

is from $1 \times 10^{22}$ to $2.5 \times 10^{22}$. A lithium ion secondary battery constituted in this way exhibits a high capacity retention when stored at high temperatures, and is able to suppress a rise in the internal resistance even with charge-discharge cycling that includes high-rate charging at low temperatures (typically 0° C. or below, such as about −15° C. or below).

In a preferred aspect of the art disclosed herein, the α is at least $1.5 \times 10^{22}$ (typically, α is from $1.5 \times 10^{22}$ to $2.5 \times 10^{22}$). According to this aspect, there can be achieved an ion secondary battery which exhibits a high capacity retention when stored at a high temperature, and in which the rise in internal resistance with charge-discharge cycling that includes high-rate charging at a low temperature has been greatly suppressed.

In another preferred aspect of the art disclosed herein, the negative electrode active material reaction surface area S per unit of battery capacity is at least 18 m$^2$. According to this aspect, there can be achieved an ion secondary battery which exhibits a high capacity retention when stored at a high temperature, and in which the rise in internal resistance with charge-discharge cycling that includes high-rate charging at a low temperature has been greatly suppressed. It is more preferable for the S to be at least 18 m² and for the α to be at least 1.2×10²² (typically, a is from 1.5×10²² to 2.5×10²²).

An example of a preferred application of the art disclosed herein is a lithium ion secondary battery for use in a low-temperature environment at or below −15° C. As described above, the lithium ion secondary battery disclosed herein exhibits a good durability (e.g., the quality of undergoing little rise in internal resistance) even to charge-discharge cycling that includes high-rate charging at a low temperature. Therefore, in batteries for use in low-temperature environments such as described above, and lithium ion secondary batteries having the possibility of being used in such environments, the significance of applying the art disclosed herein is especially large.

The lithium ion secondary battery disclosed herein is especially preferred as a battery for vehicular power supply. In the course of transport, storage and operation, vehicles may be exposed to broad temperature conditions, ranging from low to high temperatures. Moreover, depending on the region and season of use, there exists a possibility that the battery will be used in a manner that involves repeated high-rate charging at 0° C. or below (and even at about −15° C. or below). Therefore, in a lithium ion secondary battery for vehicular power supply, applying the art disclosed herein to achieve both high-temperature storability and a high level of durability to low-temperature, high-rate charging is particularly significant.

The present invention further provides a vehicle having mounted therein any of the lithium secondary batteries disclosed herein. Because the lithium ion secondary battery, as described above, is able to achieve both high temperature stability and durability to low-temperature, high-rate charging, a vehicle having such a battery mounted therein as, for example, a power supply for a motor is able to achieve a higher performance when used in a broad temperature range.

BEST MODE FOR CARRYING OUT THE INVENTION

Preferred embodiments of the invention are described below. Matters which are not specifically mentioned in the present specification but which are necessary for working the invention will be understood as matters of design by persons skilled in the art based on prior art in the field. The present invention can be practiced based on details disclosed in this specification and on common general technical knowledge in the field.

The art disclosed herein may be applied to various types of lithium ion secondary batteries which use a carbon material having at least in part a graphite structure (layered structure) in the negative electrode active material. The shape (external shape) of the battery is not subject to any particular limitation, and may be, for example, a cylindrical, rectangular or coin-like shape.

A granular carbon material (carbon particles) having at least in part a graphite structure is preferably used as the negative electrode active material. Use may be made of a carbon material which is any one of the following: a graphitic material (graphite), a non-graphitizable carbonaceous material (hard carbon), a graphitizable carbonaceous material (soft carbon), or a material having a structure which is a combination thereof. The carbon material may even be, for example, carbon particles obtained by applying amorphous carbon to the surface of graphite. The properties of the negative electrode active material preferably include, for example, granularity with an average particle size of from about 5 µm to about 50 µm. In particular, the use of carbon particles having an average particle size of from about 5 µm to about 15 µm (e.g., from about 8 µm to about 12 µm) is preferred. Because carbon particles with such a relatively small particle size have a large specific surface area (which can be understood as the reaction surface area per unit mass), they are capable of serving as a negative electrode active material suitable for more rapid charging and discharging (e.g., high-input charging). Therefore, lithium ion secondary batteries having such a negative electrode active material may be suitably employed as lithium ion secondary batteries for on-board use in vehicles.

The negative electrode (negative electrode sheet) in the art disclosed herein is typically in the form of a negative electrode mixture layer composed primarily of the above negative electrode active material that is held by a negative electrode collector. A sheet-like member composed primarily of a metal having a good electrical conductivity may be advantageously used as the negative electrode collector. The use of a negative electrode collector made of copper (Cu) or an alloy composed primarily of copper (copper alloy) is especially preferred. The size of the negative electrode collector is not subject to any particular limitation, and may be suitably selected according to the shape and other characteristics of the target lithium ion secondary battery. For example, metal foil having a thickness of about 5 µm to about 30 µm may be advantageously used as the negative electrode collector.

The negative electrode mixture layer may be more preferably formed by, for example, applying to the negative electrode collector a liquid composition (typically, a paste or slurry-type composition) prepared by dispersing the negative electrode active material in a suitable solvent, and drying the composition (negative electrode mixture layer-forming composition). Water, an organic solvent, or a mixed solvent thereof may be used as the solvent (negative electrode active material dispersant). For example, preferred use may be made of an aqueous solvent (which refers to water, or a mixed solvent composed primarily of water).

Where necessary, the negative electrode mixture layer-forming composition may also include, aside from the negative electrode active material and the solvent, one or more type of material which can be blended in the liquid composition used to form the negative electrode mixture layer in the production of an ordinary negative electrode for a lithium ion secondary battery. Such materials are exemplified by polymers which are capable of functioning as a binder and/or a flow modifier. For example, one or more suitably selected from among polymers such as polyvinylidene fluoride (PVDF), polytetrafluoroethylene (PTFE), polyvinylene fluoride-hexafluoropropylene copolymer (PVDF-HFP), styrene-butadiene rubber (SBR) and carboxymethylcellulose (CMC) may be advantageously used as the binder and/or flow modifier (typically, a viscosity modifier such as a thickener).

Although not subject to any particular limitation, the negative electrode mixture layer-forming composition has a solids content (nonvolatile content, meaning the proportion of the overall composition accounted for by the negative electrode mixture layer-forming components; also abbreviated below as "NV") which may be set to from about 40 wt % to about 60 wt %. The negative electrode active material accounts for a proportion of the solids content (negative electrode mixture layer-forming ingredients) which is typically at least 50 wt %, and generally is preferably at least 85 wt % (typically, from 85 to 99.9 wt %), and more preferably from 90 to 99.5 wt % (e.g., from 95 to 99 wt %).

A known method or a similar technique may be suitably employed when applying such a composition to the negative electrode collector. For example, a suitable coating device (e.g., gravure coater, slit coater, die coater, comma coater) may be used to coat a predetermined amount of a negative electrode mixture layer-forming composition onto the surface of a collector. The coating amount per unit surface area of the collector is not subject to any particular limitation, and may suitably vary according to, for example, the type of negative electrode sheet, the type of battery and the target performance. For example, the above composition may be coated onto both sides of a foil-like collector (e.g., a metal foil (such as copper foil) having a thickness of about 5 µm to about 30 µm may be preferably used) in a NV-equivalent coating amount (i.e., weight when dried) for the two sides combined of from about 5 to about 20 mg/cm$^2$.

After coating, by using a suitable drying means to dry the coated material and optionally pressing, a negative electrode mixture layer can be formed on the surface of the negative electrode collector. Suitable use may be made of any of various known pressing methods, such as roll pressing and platen pressing, as the pressing method.

Of the above-described construction of the negative electrode, it is preferable to select or set those factors which influence the value of $\alpha$ (e.g., factors which influence at least one of the following: the negative electrode active material reaction surface area per unit battery capacity S, and the negative electrode mixture layer pore volume per unit battery volume V) in such a way that $\alpha$ falls within the preferred range of values disclosed herein. This will be described subsequently in greater detail.

The positive electrode (positive electrode sheet) in the art disclosed herein is typically in the form of a positive electrode mixture layer composed primarily of a positive electrode active material that is held by a sheet-like positive electrode collector. One or more of various types of materials known to be capable of use as an electrode active material in lithium ion secondary batteries (e.g., oxides having a layered structure, and oxides having a spinel structure) may be used without particular limitation as the positive electrode active material. Illustrative examples include lithium-containing complex oxides such as lithium nickel complex oxides, lithium cobalt complex oxides, lithium-manganese complex oxides and lithium-magnesium complex oxides. Other examples of positive electrode active materials include polyanionic materials such as olivine-type lithium phosphates.

Here, "lithium nickel complex oxides" has a meaning which includes not only oxides in which lithium (Li) and nickel (Ni) are the constituent metallic elements, but also oxides which further contain as a constituent metallic element at least one metallic element other than lithium and nickel (i.e., a transition metallic element and/or typical metallic element other than lithium and nickel) in a proportion, based on the number of atoms, which is approximately the same as nickel or smaller than nickel (typically in a proportion that is smaller than nickel). The metallic element other than lithium and nickel may be one or more metallic element selected from the group consisting of, for example, Co, Al, Mn, Cr, Fe, V, Mg, Ti, Zr, Nb, Mo, W, Cu, Zn, Ga, In, Sn, La and Ce. Lithium cobalt complex oxides, lithium-manganese complex oxides and lithium-magnesium complex oxides also have similar meanings.

The positive electrode may be in a form obtained by depositing such a positive electrode active material, together with other ingredients such as a conductive material and a binder which are used as needed, as a laminar positive electrode mixture (positive electrode mixture layer) on a positive electrode collector. Conductive materials that may be used include carbon materials such as carbon black (e.g., acetylene black), and electrically conductive metal powders such as nickel powder. Binders that may be used include the same as those used in the negative electrode mixture layer. Preferred use may be made of a sheet-like member composed chiefly of an electrically conductive metal such as aluminum, nickel, titanium or stainless steel (typically, a metal foil having a thickness of about 5 µm to about 30 µm, such as aluminum foil) as the positive electrode collector.

The positive electrode active material accounts for a proportion of the overall positive electrode mixture which is typically at least 50 wt % (e.g., from 50 to 95 wt %), and generally is preferably about 70 to 95 wt % (e.g., from 75 to 90 wt %). The amount of conductive material, as a proportion of the overall positive electrode mixture, may be set to, for example, from 2 to 20 wt % (preferably from 2 to 15 wt %). In a composition in which a binder is used, the amount of the binder, as a proportion of the overall positive electrode mixture, may be set to, for example, from 1 to 10 wt % (preferably from 2 to 5 wt %).

The lithium ion secondary battery disclosed herein has an electrode assembly composed of the above-described positive electrode sheet and the above-described negative electrode sheet, which electrode sheets overlie one another with a separator disposed therebetween. A typical example of such an electrode assembly is a coiled electrode assembly obtained by stacking continuous lengths of both electrode sheets, either together with two separator sheets, or with a separator layer provided on the surface or the like of each electrode interposed therebetween, and coiling the sheets in the lengthwise direction. The separator used may be one which is similar to the separators employed in ordinary lithium secondary batteries, and is not subject to any particular limitation. For example, a porous sheet, nonwoven fabric or the like composed of a resin such as polyethylene (PE), polypropylene (PP), polyester, cellulose or polyamide may be used.

The lithium ion secondary battery may be constructed by housing such an electrode assembly (typically, a coiled electrode assembly), together with a lithium ion-containing nonaqueous electrolyte solution, in a suitable container (e.g., a casing made of metal or plastic, or a pack made of laminated film).

The nonaqueous electrolyte solution includes a nonaqueous solvent and a lithium compound (supporting electrolyte) which dissolves in the solvent and is capable of supplying lithium ions. Aprotic solvents such as carbonates, esters, ethers, nitriles, sulfones and lactones may be used as the nonaqueous solvent. For example, use may be made of one or more type selected from among nonaqueous solvents known to be generally capable of use in the electrolyte solution in lithium ion secondary batteries, such as ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane and γ-butyrolactone.

Lithium compounds such as inorganic lithium salts including $LiPF_6$, $LiBF_4$ and $LiClO_4$; and organic lithium salts including $LiN(SO_2CF_3)_2$, $LiN(SO_2C_2F_5)_2$, $LiCF_3SO_3$, $LiC_4F_9SO_3$ and $LiC(SO_2CF_3)_3$ may be used as the supporting electrolyte. The nonaqueous electrolyte solution may include one of these lithium compounds alone, or may include two or more such compounds in a suitable combination. In a preferred aspect of the art disclosed herein, use may be made of a nonaqueous electrolyte solution which includes $LiPF_6$ alone as the supporting electrolyte.

The concentration of the supporting electrolyte (supporting salt) in the nonaqueous electrolyte solution may be set to, for example, from 0.3 mol/L to 5 mol/L (preferably from 0.3 mol/L to 1.5 mol/L). Generally, it is suitable for the concentration to be set to from about 0.7 mol/L to about 2 mol/L (and preferably from 0.7 mol/L to 1.5 mol/L, such as from 0.7 mol/L to 1.2 mol/L). The concentration of the supporting electrolyte influences the number N of lithium ions present in the nonaqueous electrolyte solution which has permeated into the pore volume V within the negative electrode mixture layer per unit of battery capacity (i.e., the number of lithium ions in the pores of the negative electrode mixture layer per unit battery capacity). Therefore, taking into consideration the values for S and V, the concentration of the supporting electrolyte may be set such that α falls within the preferred numerical value range disclosed herein.

The lithium ion secondary battery in the art disclosed herein is characterized in that the product α of the negative electrode active material reaction surface area S per unit battery capacity and the number of lithium ions N included in the nonaqueous electrolyte solution which has permeated into a pore volume V within the negative electrode mixture layer per unit battery capacity (α=S×N) falls within a specific range in numerical values.

Here, S is defined as the value obtained by dividing the total surface area ($m^2$) of the negative electrode active material included in a region of the negative electrode mixture layer lying opposite the positive electrode mixture layer by the battery capacity (Ah). Here, "region of the negative electrode mixture layer lying opposite the positive electrode mixture layer" refers to the region of the negative electrode mixture layer where lithium ion exchange with the positive electrode mixture layer, through the separator, is possible; i.e., the region which takes part in charging and discharging of the battery (sometimes referred to below as the "effective region"). Thus, for example, in an electrode assembly having a construction in which positive and negative electrode sheets composed of mixture layers provided on either side of a collector have been coiled together with two separator sheets disposed therebetween, when the separator sheets and the negative electrode sheet are wrapped for an additional turn outside of the portion where the outermost turn of the positive electrode sheet in the electrode assembly has been disposed, because the negative electrode mixture layer disposed on the inside of the negative electrode collector in the wrapped negative electrode sheet faces the positive electrode mixture layer disposed on the outside of the positive electrode collector in the outermost positive sheet, it is included in the effective region. On the other hand, because the negative electrode alloy layer disposed on the outside of the negative electrode collector in the negative electrode sheet that has been wrapped outermost does not have a facing positive electrode mixture layer on the outside thereof, it is not included in the effective region. Moreover, when a positive electrode sheet and a negative electrode sheet are stacked over one another, in cases where, as viewed from the stacking direction (the direction perpendicular to the sheet surface), a portion of the negative electrode mixture layer is disposed so as to protrude outside of the positive electrode mixture layer, this protruding portion also is regarded as not being included within the effective region.

In the above definition of S, the total surface area of the negative electrode active material included in the effective region may be determined from the total weight of the negative electrode mixture layer in the region, the content of the negative electrode active material in the negative electrode mixture layer, and the specific surface area of the negative electrode active material. The BET specific surface area value obtained by an ordinary nitrogen adsorption method may be employed as the value of the specific surface area of the negative electrode active material.

In the above definition of S, "battery capacity" refers to the discharge capacity (Ah) obtained when, at a temperature of 25° C., the lithium ion secondary battery to be measured has been charged at a constant current of 1C to a voltage across the terminals of 4.1 V, then charged at a constant voltage to a total charging time of 2.5 hours, left at rest for 10 minutes, then discharged from 4.1 V down to 3.0 V at a constant current of 0.33C, and subsequently discharged at a constant voltage to a total discharging time of 4 hours.

V above is defined as the value obtained when the total volume ($m^3$) of pores within the negative electrode mixture layer included in the effective region is divided by the battery capacity (Ah). Here, "battery capacity" has the same meaning as battery capacity in the definition of S. The total volume of pores within the negative electrode mixture layer included in the effective region may be determined by, for example, subtracting the combined volume of each ingredient making up the negative electrode mixture layer (e.g., volume of negative electrode active material+volume of thickener+volume of binder) from the volume of the negative electrode mixture layer included in the effective region (which volume may be computed by, for example, the following formula: (surface area of negative electrode mixture layer included in effective region)×(thickness of negative electrode mixture layer)), or by the following formula: (volume of negative electrode mixture layer included in effective region)×(porosity of negative electrode mixture layer). The porosity may be measured using, for example a commercial mercury porosimeter. Finally, the above value N may be determined from the above value V and the concentration (volumetric molar concentration) of the supporting electrolyte in the nonaqueous electrolyte solution that is used.

The inventors have found that, as the negative electrode active material reaction surface area S per unit battery capacity becomes larger, the storage stability (capacity retention) of the battery has a tendency to decrease, and that at a greater number of lithium ions included per unit volume of the nonaqueous electrolyte solution (i.e., a higher supporting salt concentration), such a tendency becomes more acute. This is thought to involve the following: as the number of lithium ions per unit volume of the nonaqueous electrolyte solution rises, the amount of solid electrolyte interphase (SEI) formation becomes excessive and the lithium that has been taken up by this large amount of SEI is no longer able to contribute to the battery reactions, thus lowering the battery capacity.

Increasing the reaction surface area of the active material may be an effective way to enhance the low-temperature characteristics of the battery. Also, it is conceivable that increasing the amount (number) of lithium ions present in the nonaqueous electrolyte solution that has permeated into the mixture layer may serve as an advantageous factor in the low-temperature characteristics of the battery. Accordingly, the inventor has conducted careful investigations on the relationship of the storage stability and low-temperature characteristics of the battery with the reaction surface area S of the negative electrode active material and the number of lithium ions N present in the nonaqueous electrolyte solution within a negative electrode mixture layer. On completing such investigations, the inventor discovered that the reaction surface area S and the number of lithium ions N can be increased without a large loss in storage stability (e.g., capacity retention during high-temperature storage). That is, with a lithium ion secondary battery for which the product $\alpha$ of the reaction surface area S ($m^2$) with the number of lithium ions N is in a range of from $1 \times 10^{22}$ to $2.5 \times 10^{22}$, both high capacity retention during storage at elevated temperatures and suppression in the rise of the internal resistance with charge-discharge cycling that includes high-rate charging at low temperatures can be achieved at the same time to a high level.

In a preferred aspect of the art disclosed herein, $\alpha$ is from $1.5 \times 10^{22}$ to $2.5 \times 10^{22}$. According to this aspect, there can be achieved an ion secondary battery which exhibits a high capacity retention when stored at a high temperature, and in which the rise in internal resistance with charge-discharge cycling that includes high-rate charging at a low temperature has been greatly suppressed.

The reaction surface area S may be suitably set, while taking into consideration the number N of lithium ions, in such a way that $\alpha$ falls within the above range. Generally, it is appropriate for S to be set to at least 15 $m^2$ (e.g., from 15 to 50 $m^2$). If the reaction surface area S is too small, even when a sufficient number of lithium ions are present in the nonaqueous electrolyte solution which has permeated into the negative electrode mixture layer, depending on the charge-discharge conditions (e.g., under low-temperature conditions), the rate of movement by the lithium ions in and out of the negative electrode mixture layer will be inadequate, as a result of which the cycle characteristics during low-temperature charging and discharging may have a tendency to decrease. In a preferred aspect of the invention, S is at least 18 $m^2$ (e.g., from 18 to 50 $m^2$). According to this aspect, there can be achieved an ion secondary battery which exhibits a high capacity retention when stored at a high temperature, and in which the rise in internal resistance with charge-discharge cycling that includes high-rate charging at a low temperature has been greatly suppressed. The value of S may be adjusted by means of, for example, the specific surface area of the negative electrode active material used, the content of the negative electrode active material in the negative electrode mixture layer, and the weight of the negative electrode mixture applied (coating weight).

The number N of lithium ions may be suitably set, while taking into consideration the reaction surface area S, in such a way that $\alpha$ falls within the above range. The above value N depends on the pore volume V of the negative electrode mixture layer and the lithium ion concentration of the nonaqueous electrolyte solution. The pore volume V may be adjusted by means of, for example, the physical properties of the negative electrode active material used (e.g., average particle size, particle size distribution, tap density, etc.), the content of the negative electrode active material in the negative electrode mixture layer, the density of the negative electrode mixture layer (which may be regulated via, for example, the pressing conditions, the NV of the negative electrode mixture layer-forming composition, and the drying conditions), and the weight of the negative electrode mixture applied (coating weight).

The construction of an embodiment of the lithium ion secondary battery obtained by employing the art disclosed herein is briefly described below while referring to the accompanying diagrams. The lithium ion secondary battery 10 shown in FIG. 3 has a flat, rectangular container 11 (typically made of metal, although it may be made of plastic). Within this container 11, there is housed a coiled electrode assembly 30 obtained by stacking together and coiling a positive electrode sheet 32, a negative electrode sheet 34 and two separator sheets 35. The positive electrode sheet 32 is composed of a positive electrode mixture layer that has been provided on both sides of a continuous positive electrode collector (e.g., aluminum foil), with one end along the lengthwise direction of this collector being left as an uncoated strip. The negative electrode sheet 34 has a construction in which a negative electrode mixture layer has been provided on both sides of a continuous negative electrode collector (e.g., copper foil), with one end along the lengthwise direction of this collector being left as an uncoated strip. In the coiled electrode assembly 30, the two electrode sheets 32 and 34 are stacked and coiled together in such a way that the portions of the electrode sheets where mixture layers have not been provided (i.e., the mixture layer-free areas 32A and 34A) extend out respectively from opposite ends of the separator sheets 35 along the lengthwise direction. By laterally pressing and flatten this coiled assembly, it is formed into a flat shape that fits the shape of the container 11.

Figure 3:
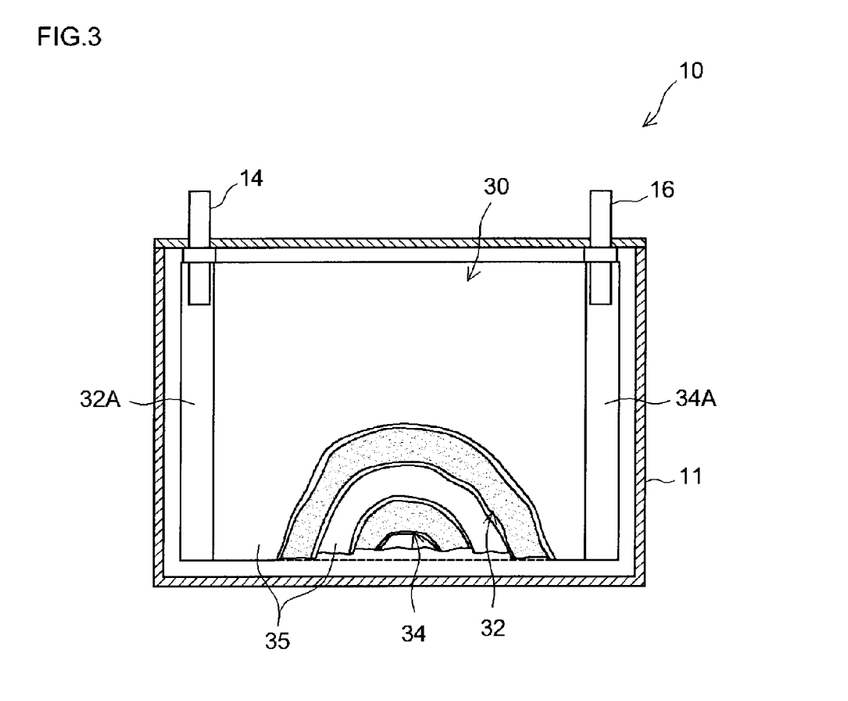
FIG. 3 is a partial cross-sectional view illustrating the structure of a lithium ion secondary battery according to an embodiment of the invention.

A positive electrode terminal 14 and a negative electrode terminal 16 for external connection are electrically connected to the electrode sheets 32 and 34. Such connection may be suitably carried out by gathering together, in the radial direction of the coiled electrode assembly 30, the respective mixture layer-free portions 32A and 34A of the electrode sheets 32 and 34 which extend out from the separator sheets 35, and respectively connecting (e.g., welding) the positive electrode terminal 14 and the negative electrode terminal 16 to these gathered portions. The lithium ion secondary battery 10 according to this embodiment is built by housing the electrode assembly 30 to which the terminals 14 and 16 have been connected in the container 11, supplying a suitable nonaqueous electrolyte solution to the interior thereof, and sealing the container 11.

Several examples of the invention are provided below, although these examples are not intended to limit the scope of the invention.

Production of Lithium Ion Secondary Battery

Nine types of graphite powder C1 to C9 having different specific surface areas were prepared, and negative electrodes in which these graphite powders are used as the negative electrode active material were produced. That is, the respective graphite powders, SBR and CMC, in a weight ratio therebetween of 98:1:1, were mixed with ion-exchanged water to a NV of 45 wt % so as to prepare compositions for formation of the negative electrode mixture layer. These compositions were coated onto both sides of a continuous copper foil (negative electrode collector) having a thickness of 10 µm and dried, thereby forming negative electrode mixture layers. The coating weight (solids content basis) of the composition for both sides combined was adjusted so as to be 7.0 mg/cm². After drying, the negative electrode collector and the negative electrode mixture layers on both sides thereof were pressed to a total thickness of 60 µm. In this way, a total of nine types of sheet-like negative electrodes (negative electrode sheets C1 to C9) were produced for the respective graphite powders C1 to C9. The graphite powders used here were all composed primarily of spherical graphite particles. The differences between the above specific surface areas are due primarily to the differences in the average particle sizes of the graphitic particles making up the respective graphite powders.

A positive electrode mixture layer-forming composition was prepared by mixing lithium nickel oxide ($LiNiO_2$) powder as the positive electrode active material, acetylene black as the conductive material, and PVDF as the binder together with NMP in a weight ratio between these materials of 87:10:3 and to a solids concentration (NV) of about 40 wt %. This composition was coated onto both sides of a continuous aluminum foil (positive electrode collector) having a thickness of 15 μm and dried, thereby forming positive electrode mixture layers. The coating weight (solids content basis) of the composition was adjusted to about 12.8 mg/cm$^2$ for both sides combined. After drying, the positive electrode collector and the positive electrode mixture layers on both sides thereof were pressed to a total thickness of 25 μm, thereby producing a sheet-like positive electrode (positive electrode sheet).

The respective negative sheets C1 to C9 were laminated with the above positive electrode sheet and two continuous separator sheets, and the laminated sheets were coiled in the lengthwise direction to produce a coiled electrode assembly. Porous polyethylene sheets having a thickness of 25 μm were used as the separator sheets. A total of nine types of coiled electrode assemblies (electrode assemblies C1 to C9) corresponding to the respective negative electrode sheets C1 to C9 were fabricated in this way.

$LiPF_6$ (supporting electrolyte) was dissolved in a mixed solvent containing EC, DMC and EMC in a volumetric ratio of 3:3:4, and five types of nonaqueous electrolyte solutions having different $LiPF_6$ concentrations were prepared. The specific $LiPF_6$ concentrations in these nonaqueous electrolyte solutions were 0.9 mol/L (referred to below as the "0.9 M electrolyte solution"), 1.0 mol/L (1.0 M electrolyte solution), 1.1 mol/L (1.1 M electrolyte solution), 1.2 mol/L (1.2 M electrolyte solution), and 1.3 mol/L (1.3 M electrolyte solution).

By combining the nine types of electrolyte assemblies with the five types of electrolyte solutions prepared above and housing them in an outer case, 18650-type lithium ion secondary batteries were constructed. That is, electrode assemblies C3 to C9 were respectively combined with the 0.9 M electrolyte solution, electrode assemblies C1 to C9 were respectively combined with the 1.0 M electrode solution, electrode assemblies C1 to C9 were respectively combined with the 1.1 M electrode solution, electrode assemblies C3 to C9 were respectively combined with the 1.2 M electrode solution, and electrode assemblies C3 to C9 were respectively combined with the 1.3 M electrode solution, thereby producing a total of 39 types of lithium ion secondary batteries (Samples 1 to 39).

Computing α

Measurement of Initial Capacity

Each of the batteries of Samples 1 to 39 was charged under temperature conditions of 25° C., first at a constant current of 1C (here, 0.2 A) until a voltage across the terminals reached 4.1 V, then at a constant voltage to a total charging time of 2.5 hours (CC-CV charging). After 10 minutes of rest following the completion of charging, the batteries were discharged at 25° C., first at a constant current of 0.33C from 4.1 V down to 3.0 V, then at a constant voltage to a total discharging time of 4 hours. The discharge capacity at this time was treated as the initial capacity Q1 (Ah) for the respective batteries. The batteries of Samples 1 to 39 each had an initial capacity Q1 of about 0.2 Ah.

Negative Electrode Active Material Reaction Surface Area S Per Unit Battery Capacity The weight of the negative electrode active material included in the region of the negative electrode mixture layer which lies opposite the positive electrode mixture layer, with the separator sheet disposed therebetween, was 0.84 g in each of the electrode assemblies C1 to C9. The negative electrode active material reaction surface area S (m$^2$) per unit battery capacity (1 Ah) was computed by multiplying this weight (g) with the specific surface area (m$^2$/g) of each of the negative electrode active materials C1 to C9 used, and dividing the resulting value by the initial capacity Q1 (Ah) of the battery. The values obtained are shown in Table 1.

Number of Lithium Ions N in Negative Electrode Mixture Layer Per Unit Battery Capacity The porosity of the negative electrode mixture layer in the electrode assemblies C1 to C9 fabricated above was computed by the following formula: {(surface area of negative electrode mixture layer included in effective region)×(thickness of negative electrode mixture layer)−(volume of negative electrode active material+volume of SBR+volume of CMC)}/{(surface area of negative electrode mixture layer included in effective region)×(thickness of negative electrode mixture layer)}, and was found to be 36.4% in electrode assembly C1, 36.9% in C2, 36.4% in C3, 37.4% in C4, 35.9% in C5, 36.9% in C6, 37.4% in C7, 36.4% in C8, and 37.4% in C9.

The total volume of pores included in the above effective region was determined for each of the electrode assemblies C1 to C9 from the above porosities and negative electrode mixture layer thicknesses. By dividing the resulting value by the initial capacity Q1 (Ah) of the battery, the pore volume V within the negative electrode mixture layer per unit (1 Ah) of battery capacity was determined Next, the number of lithium ions N included in the above pore volume V was determined from the lithium ion concentration of the electrolyte solution used to construct each battery.

By multiplying together the values S and N determined as described above, the value of α for the battery in each of Samples 1 to 39 was computed. The values thus obtained are shown in Table 1.

Capacity Retention at High-Temperature Storage

Under temperature conditions of 25° C., the batteries of Samples 1 to 39 were adjusted to a state of charge (SOC) of 100% by constant-current, constant-voltage (CC-CV) charging which involved charging the battery at a constant current of 1C to 4.1 V, then charging at a constant voltage to a total charging time of 3 hours. These batteries were stored in a 60° C. environment for 30 days, following which they were discharged at a temperature of 25° C. under the same conditions as during the initial capacity measurement described above, at which time the battery capacity (battery capacity Q2 following high-temperature storage) was measured. The capacity retention during the above high-temperature storage was then computed using the following formula: Q2/Q1×100(%). The results obtained are shown in Tables 1 and 2, and in FIG. 1.

Percent Rise of Internal Resistance During Low-Temperature High-Rate Cycling

Under temperature conditions of 25° C., the batteries of Samples 1 to 39 were adjusted to a state of charge (SOC) of 60% by charging at a constant current of 1C until the voltage across the terminals reached 3.75 V, then charging at a constant voltage to a total charging time of 120 minutes. Next, discharging and charging for 10 seconds each were alternately carried out at the same temperature and at current values for each battery of ⅓C, 1C, 2C and 3C, and the voltage 10 seconds after the start of discharge was measured. The current value (X axis) and voltage value (Y axis) at this time were subjected to linear regression analysis, and the initial internal resistance R1 (mΩ) for each battery was determined from the resulting slope.

Each battery was then adjusted to a SOC of 60% in the same way as described above. Next, under a test environment of −15° C., the batteries were subjected to 4,000 cycles of operation, each cycle consisting of 10 seconds of charging at a constant current of 20C (here, 4 A), 5 seconds at rest, 200 seconds of discharging at a constant current of 1C (0.2 A), and 145 seconds at rest. During testing, the operation of readjusting the battery SOC to 60% was carried out every 100 cycles. Specifically, the SOC of the battery was readjusted to 60% during the test by discharging to 3.75 V at a constant current of 1C, then discharging at a constant voltage to a total discharging time of 240 seconds (if the battery voltage during the test is lower than 3.75 V at the start of this SOC adjustment operation, discharging does not actually occur even when the above discharging operation is carried out) and 10 seconds at rest, followed by charging to 3.75 V at a constant current of 1C, then charging at a constant voltage to a total charging time of 240 seconds (if the battery voltage during the test is higher than 3.75 V at the start of this SOC adjustment operation, charging does not actually occur even when the above charging operation is carried out) and 10 seconds of rest.

Figure 1:
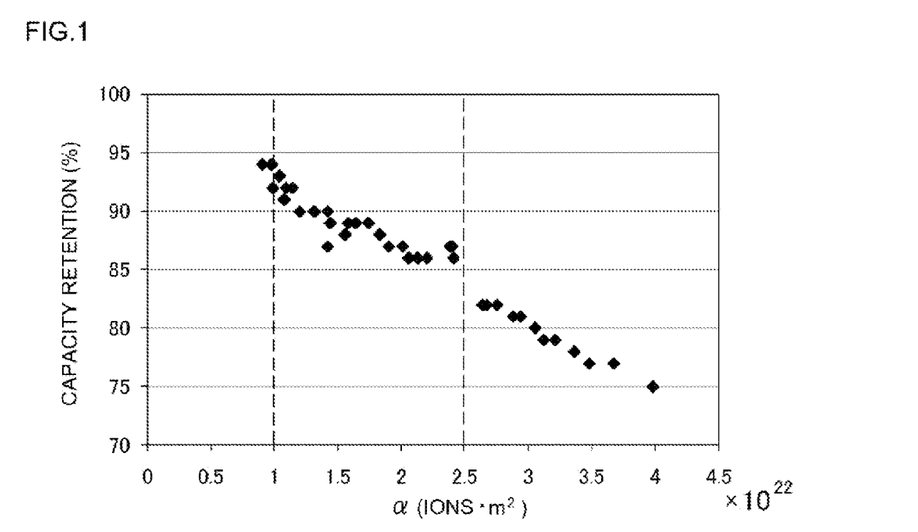
FIG. 1 is a graph showing the relationship between capacity retention and α.
Figure 2:
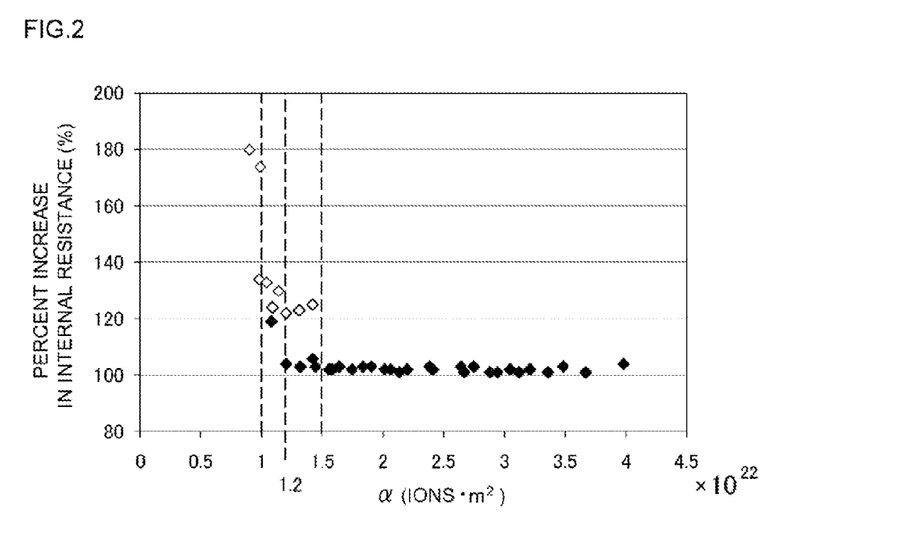
FIG. 2 is a graph showing the relationship between percent increase in internal resistance and α.

After 4,000 charge-discharge cycles at −15° C. were carried out in this way, under temperature conditions of 25° C., the internal resistance R2 (mΩ) following low-temperature high-rate cycling was determined by the same method as that used above to measure the initial internal resistance. The percent increase in internal resistance with low-temperature, high-rate cycling was then computed by the following formula: R2/R1×100(%). The results obtained are shown in Tables 1 and 2. In addition, FIG. 1 shows a graph which plots the capacity retention versus a, and FIG. 2 shows a graph which plots the percent rise in internal resistance versus a. Data points plotted in FIG. 2 with open diamonds represent samples having an S value of less than 18 m$^2$, and data points plotted in FIG. 2 with closed diamonds represents samples having an S value of 18 m$^2$ or more.

TABLE 1

| Sample | Graphite powder | S (m$^2$) | Li ion concentration | α (×10$^{22}$) | Capacity Retention (%) | Rise in internal resistance (%) |
|---|---|---|---|---|---|---|
| 1 | C3 | 16.6 | 0.9M | 0.98 | 94 | 134 |
| 2 | C4 | 18.3 | 0.9M | 1.08 | 91 | 119 |
| 3 | C5 | 24.1 | 0.9M | 1.42 | 90 | 106 |
| 4 | C6 | 27.9 | 0.9M | 1.64 | 89 | 103 |
| 5 | C7 | 36.6 | 0.9M | 2.13 | 86 | 101 |
| 6 | C8 | 40.7 | 0.9M | 2.41 | 86 | 102 |
| 7 | C9 | 46.6 | 0.9M | 2.75 | 82 | 103 |
| 8 | C1 | 13.7 | 1.0M | 0.9 | 94 | 180 |
| 9 | C2 | 15.8 | 1.0M | 1.04 | 93 | 133 |
| 10 | C3 | 16.6 | 1.0M | 1.09 | 92 | 124 |
| 11 | C4 | 18.3 | 1.0M | 1.2 | 90 | 104 |
| 12 | C5 | 24.1 | 1.0M | 1.58 | 89 | 102 |
| 13 | C6 | 27.9 | 1.0M | 1.83 | 88 | 103 |
| 14 | C7 | 36.6 | 1.0M | 2.4 | 87 | 102 |
| 15 | C8 | 40.7 | 1.0M | 2.67 | 82 | 101 |
| 16 | C9 | 46.6 | 1.0M | 3.05 | 80 | 102 |
| 17 | C1 | 13.7 | 1.1M | 0.989 | 92 | 174 |
| 18 | C2 | 15.8 | 1.1M | 1.14 | 92 | 130 |
| 19 | C3 | 16.6 | 1.1M | 1.2 | 90 | 122 |
| 20 | C4 | 18.3 | 1.1M | 1.32 | 90 | 103 |
| 21 | C5 | 24.1 | 1.1M | 1.74 | 89 | 102 |
| 22 | C6 | 27.9 | 1.1M | 2.01 | 87 | 102 |
| 23 | C7 | 36.6 | 1.1M | 2.64 | 82 | 103 |
| 24 | C8 | 40.7 | 1.1M | 2.94 | 81 | 101 |
| 25 | C9 | 46.6 | 1.1M | 3.36 | 78 | 101 |

TABLE 2

| Sample | Graphite powder | S (m$^2$) | Li ion concentration | α (×10$^{22}$) | Capacity Retention (%) | Rise in internal resistance (%) |
|---|---|---|---|---|---|---|
| 26 | C3 | 16.6 | 1.2M | 1.31 | 90 | 123 |
| 27 | C4 | 18.3 | 1.2M | 1.44 | 89 | 103 |
| 28 | C5 | 24.1 | 1.2M | 1.9 | 87 | 103 |
| 29 | C6 | 27.9 | 1.2M | 2.2 | 86 | 102 |
| 30 | C7 | 36.6 | 1.2M | 2.88 | 81 | 101 |
| 31 | C8 | 40.7 | 1.2M | 3.21 | 79 | 102 |
| 32 | C9 | 46.6 | 1.2M | 3.67 | 77 | 101 |
| 33 | C3 | 16.6 | 1.3M | 1.42 | 87 | 125 |
| 34 | C4 | 18.3 | 1.3M | 1.56 | 88 | 102 |
| 35 | C5 | 24.1 | 1.3M | 2.06 | 86 | 102 |
| 36 | C6 | 27.9 | 1.3M | 2.38 | 87 | 103 |
| 37 | C7 | 36.6 | 1.3M | 3.12 | 79 | 101 |
| 38 | C8 | 40.7 | 1.3M | 3.48 | 77 | 103 |
| 39 | C9 | 46.6 | 1.3M | 3.98 | 75 | 104 |

As is apparent from these results, compared with samples for which α was larger than 2.5×10$^{22}$, samples for which α was 2.5×10$^{22}$ or less had a clearly better capacity retention in high-temperature storage (here, 30 days at 60° C.) (see FIG. 1). Moreover, compared with samples for which α was smaller than 1×10$^{22}$, in samples for which α was 1×10$^{22}$ or more, the rise in internal resistance due to charge-discharge cycling which included low-temperature, high-rate charging was markedly suppressed (see FIG. 2). In samples having an S value of 18 m$^2$ or more, within an a range of 1.2×10$^{22}$ and above, the rise in internal resistance was suppressed to a high degree (more specifically, the amount of increase was 10% or less). In samples for which α was larger than 1.5×10$^{22}$, it was confirmed that an excellent internal resistance rise-suppressing effect characterized by an increase in internal resistance of 10% or less is achieved regardless of the value of S.

The present invention has been described in detail, although the embodiments presented above are to be considered in all respects as illustrative and not limitative. Various changes and modifications may be made thereto without departing from the spirit and scope of the invention.

INDUSTRIAL APPLICABILITY

Figure 4:
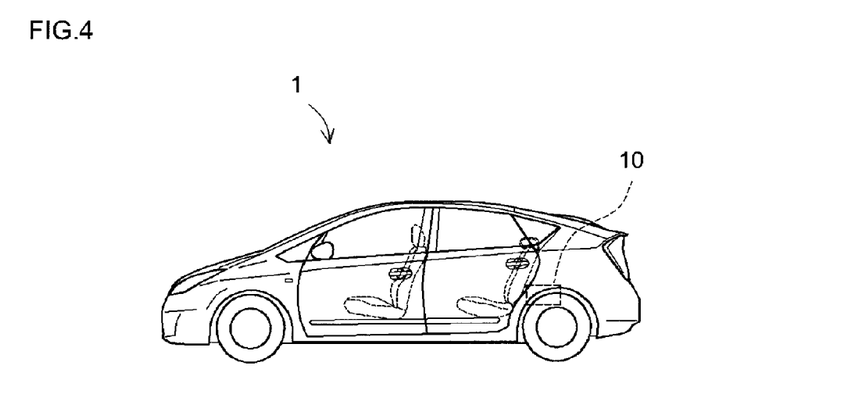
FIG. 4 is a schematic side view showing a vehicle (automobile) equipped with a lithium secondary battery according to an embodiment of the invention.

The lithium ion secondary batteries provided by the art disclosed herein, by exhibiting an excellent performance as described above, are capable of being employed as lithium ion secondary batteries for various applications. For example, they may be advantageously used as a power supply for motors mounted in vehicles such as automobiles. Such lithium ion secondary batteries may be used in the form of an assembled battery obtained by connecting a plurality of the lithium ion secondary batteries in series or in parallel. Therefore, as shown schematically in FIG. 4, it is possible to provide, by way of the art disclosed herein, a vehicle (typically an automobile, and especially an automobile having a motor, such as a hybrid automobile, an electric automobile or a fuel cell automobile) 1 equipped with such a lithium ion secondary battery (which may be in the form of an assembly battery) 10 as the power supply.

The invention claimed is:

1. A lithium ion secondary battery, comprising:
an electrode assembly in which a positive electrode sheet having a positive electrode mixture layer on a positive electrode collector and a negative electrode sheet having a negative electrode mixture layer on a negative electrode collector are overlain each other with a separator disposed therebetween, the electrode assembly being a coiled electrode assembly housed in a container together with a lithium ion-containing nonaqueous electrolyte solution, wherein
the negative electrode mixture layer contains, as a negative active material which is the primary component thereof, a carbon material having at least in part a graphite structure, and the porosity of the negative electrode mixture layer is greater than or equal to 35.9% and less than or equal to 37.4%, and
when S (m$^2$) represents a value obtained by calculating a total surface area of the negative electrode active material included in a region of the negative electrode mixture layer lying opposite the positive electrode mixture layer per 1 Ah of capacity of the battery, V represents a value obtained by calculating a total volume of pores included in the region of the negative electrode mixture layer per 1 Ah of capacity of the battery, and N represents the number of lithium ions included within the volume V of the nonaqueous electrolyte solution, the value α computed by the following formula (A):

$$\alpha = S \times N \tag{A}$$

is from $1 \times 10^{22}$ to $2.5 \times 10^{22}$ ions·m$^2$.

2. The battery of claim 1, wherein the S is at least 18 m$^2$.

3. The battery of claim 1, wherein the α is at least $1.5 \times 10^{22}$ ions·m$^2$.

4. The battery of claim 2, wherein the α is at least $1.2 \times 10^{22}$ ions·m$^2$.

5. The battery of claim 1, wherein the carbon material has a specific surface area of greater than or equal to 4.4 m$^2$/g and less than or equal to 11.1 m$^2$/g.

6. The battery of claim 1 which is used in an environment of −15° C. or below.

7. The battery of claim 1 which is used as a vehicle power supply.

8. A vehicle having mounted therein the battery according to claim 1.

* * * * *